Feb. 8, 1927. 1,616,959
A. HUETTER
EXPANSIBLE CORE
Filed Sept. 17, 1923
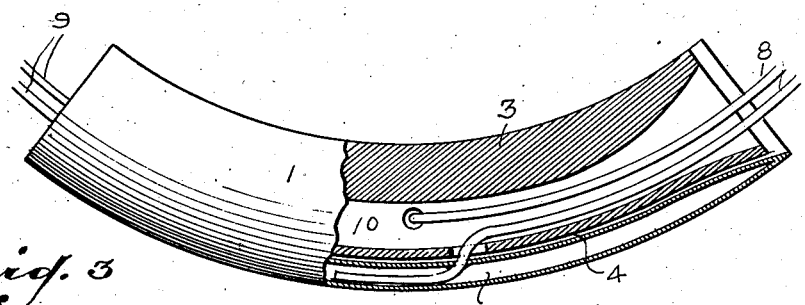
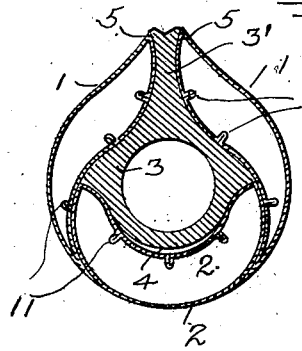
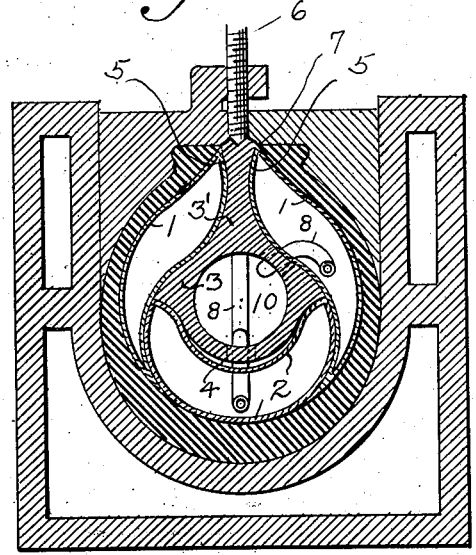
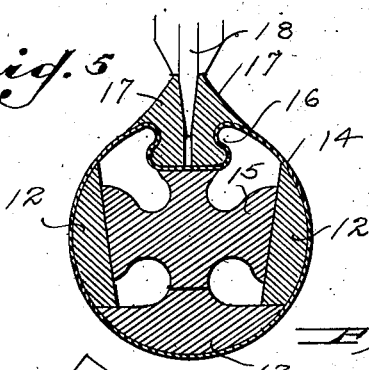
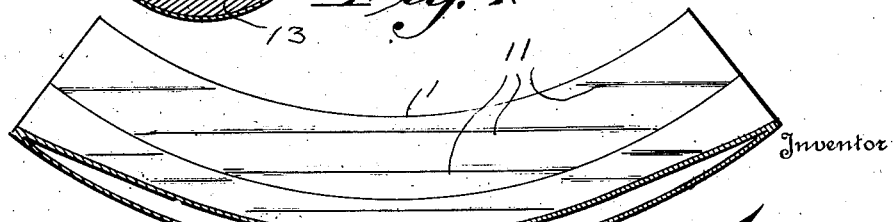
Inventor
Andrew Huetter
By H. R. Walker, Attorney Patented Feb. 8, 1927.

1,616,959

UNITED STATES PATENT OFFICE.

ANDREW HUETTER, OF DAYTON, OHIO, ASSIGNOR TO THE ARTYR COMPANY, OF DAYTON, OHIO. A CORPORATION OF OHIO.

EXPANSIBLE CORE.

Application filed September 17, 1923. Serial No. 663,202.

My invention relates to molds for plastic material and more particularly to an expansible core for use in the manufacture and repair of pneumatic tires for vehicles and like articles.

The invention contemplates an expansible arcuate core body, subjected to both internal fluid pressure and mechanical pressure by which the several relatively movable sections or units comprising the core assembly may be adjusted in relation with each other to expand such core while maintaining substantially uniform or continuous exterior surface. To this end the principal and prefered form of construction embodies longitudinally disposed hollow sides and tread members preferably though not necessarily of flexible but inextensible material, which hollow members are suitably connected with a source of fluid under pressure, preferably superheated steam, and are arranged about a centrally disposed pressure bar having thereon cam faces, engaging the respective sections or units, and capable of deflecting such units when pressure is applied in the plane of the tire being made or repaired, or diametrically in relation with the arcuate form of the core. As developments and modifications of this primary construction, the invention also includes the use of expansion joints in such hollow fluid pressure units, facilitating the deflection or distortion of such units, and also a form wherein the units are solid and subjected to mechanical pressure only, but enclosed within a steam tight expansible jacket having the desired contour.

In the manufacture of vehicle tire casings and the like, it is the practice to build the tire casing about a suitable core or mandrel and subsequently during the curing operation of the tire casing within the mold or matrix to subject the tire casing to internal pressure. A similar procedure is followed in the repairing of tire casings, with the exception, however, that only a short portion or segment of the tire casing is subjected to such internal pressure, by having placed therein an expansive mandrel or core. The most general practice has been the use of elastic air bags made of fabric or rubber or these materials in combination. The life of such elastic or expansible air bags has been quite short due to their deterioration under the influence of heat in the vulcanizing operation. The present invention seeks to overcome the objections to the elastic expansible air bags by affording a metallic expansible core, wherein the tire casing may be subjected to mechanical pressure, or mechanical pressure and fluid pressure in combination, while at the same time subjecting the interior of the tire casing to vulcanizing or curing temperature.

The object of the invention is to simplify the structure as well as the means and mode of operation, of expansible tire cores or mandrels, whereby they will not only be cheapened in construction, but will be more efficient in use, positive in operation, uniform in action, of greater durability, and unlikely to get out of repair.

A further object of the invention is to provide an improved form of expanding mandrel or core, wherein the internal pressure will be equalized upon the sides and tread of the tire casing, and which will furthermore subject the bead or margins of the casings to similar expanding pressure.

A further object of the invention is to provide an expanding core, employing mechanical pressure and to provide in conjunction therewith, a heating unit for the circulation of live steam or the like.

With the above primary and other incidental objects in view as will more fully appear in the specification, the invention consists of the features of construction, the parts and combinations thereof, and the mode of operation or their equivalents as hereinafter described and set forth in the claims.

Referring to the accompanying drawings, wherein are shown the preferred embodiment of the invention, Fig. 1 is a side elevation of the assembled core, partly in section. Fig. 2 is a transverse sectional view of the core enclosed within a casing and matrix and illustrating the application of mechanical expanding pressure. Fig. 3 is a transverse sectional view of the core or mandrel structure similar to that shown in Figs. 1 and 2, but embodying a series of expansion joints, whereby the hollow units subjected to internal fluid pressure are capable of distortion or expansion under the influence of such internal pressure. Fig. 4 is an interior side elevation of one of the side members and a longitudinal section of the tread member. Figs. 5 and 6 are transverse sectional views of modifications employing mechanical pressure.

Like parts are indicated by similar characters of reference throughout the several views.

The arcuate mandrel or core forming the subject matter hereof may be employed singly for the purpose of repairing tire casings, or a series of such cores or mandrels may be joined end to end to form an annular succession or complete ring core for tire casing manufacturing purposes. In the latter event, one of the mandrels or cores would necessarily be provided with parallel ends to form a key section removable inwardly to enable the removal of the core or mandrel unit after the completion of the tire casing. Such construction and arrangement of separable arcuate mandrels or core units being quite well known and since it forms no part of the invention per se, has not been shown in the drawings.

The expansible core or mandrel forming the subject matter hereof comprises a series of longitudinally disposed relatively movable members including oppositely disposed side sections, 1—1, of reverse curve or ogee form in cross section, and an intermediate tread section 2 of substantially channel form in cross section, the convex lateral sides of which are overlapped by the concave margins of the adjacent side sections 1. These relatively adjustable sections 1 and 2 are preferably though not necessarily of hollow construction to enable the circulation of live steam or other heating medium therethrough. To this end, they are preferably constructed of flexible, but inextensible sheet material, having heat resistant properties, such as sheet metal, frictional canvas, rubberized canvas, fiber, composition, hard rubber, or other materials having the necessary characteristics. See Patents Nos. 1,367,631 and 1,439,895. However, they may be formed rigidly of cast metal. The double curved or ogee side sections are reduced to substantially feather edges on their longitudinal margins. This enables the external faces of the side sections 1 to merge easily on to the convex exterior contour of the medial tread section 2.

These relatively adjustable sections 1 and 2 are arranged about and enclose a longitudinally disposed arcuate pressure bar 3. The outer face of this pressure bar 3 is of double ogee form. The lateral edges of which rest upon the lateral margins of the channel shaped tread portion 2. The double ogee outer face of the pressure bar 3 does not conform closely to the interior of the channel of the tread section 2, but while bearing upon the sides of such channel it affords a clearance space 4, intermediate the convex portion of the pressure bar and the interior of the channel. Thus as the channel bar 3 is advanced toward the tread section 2, it not only tends to bodily shift such channel shape tread section to exert increased pressure upon the tread portion of the tire, but it also tends to distort or spread such tread section in the event that the latter is of flexible character, by exerting a wedging action.

The pressure bar 3 is provided with an inwardly extending longitudinal flange portion 3' the sides of which are of double concave form affording adjacent to the inner margin of such flange portion, oppositely disposed inclined shoulders or cam faces 5. These cam faces 5 are interposed between the inner margins of the side sections 1—1 and upon a shifting movement of the pressure bar 3 in the plane of the tire, these inclined cam faces exert a wedging action upon the side sections 1 to separate them to exert lateral internal pressure upon the bead portions of the tire casing.

When the assembled core or mandrel is enclosed within a tire casing and the casing in turn enclosed within a matrix or mold as shown in Fig. 2, the flange portion 3' of the pressure bar is subjected to outward pressure by any suitable means such as a series of adjusting screws 6, which bear upon the inner edge of the flanged pressure bar. It will be understood that the screws 6 are shown for illustrative purposes, and that other pressure means, as for instance a cam action or toggle movement may be employed in lieu thereof, when subjected to such pressure the bar 3 operates to separate the inner margins 7 of the side sections 1 and at the same time press the tread section 2 outwardly. The arcuate overlapping portions of the side section 1 and tread portion 2 are of such contour that the outward pressure of the tread section 2 exerts a camming action which tends to spread the outer and overlapping margins of the side sections. Thus the mandrel or core is expanded throughout its entire sectional contour. While the sections 1 and 2 have been shown and described as of hollow formation, they may, however, be solid. If of hollow formation, steam inlet and outlet conduits 8 and 9 are provided communicating with the respective sections 1 and 2. To save material and reduce the weight of the mandrel, the pressure bar 3 is preferably provided with a longitudinal opening or bore 10, extending therethrough. This bore 10 may if desired be utilized by extending the steam inlet and outlet conduits 8 and 9 into such passage 10 and thence through suitable openings in the walls into communication with the respective hollow sections 1 and 2. It will be understood that the openings through which such conduits extend into communication with the hollow sections are of ample size to afford clearance for the relative movement of the sections.

In the event that the sections are constructed of flexible material, the steam pressure may be utilized to augment the pressure or expansion produced by adjustment of the pressure bar. In such construction, the pressure bar may be initially adjusted to insure uniform contact of the adjustable sections with the interior of the tire casing, and to exert mechanically an initial pressure, which will be augmented by the distortion of the flexible hollow sections 1 and 2 under the influence of internal fluid pressure. To this end there has been shown in Fig. 3 a modification wherein the inner walls of the sections 1 and 2 are provided with longitudinally disposed expansion joints or infolded plaits 11, which permit the inner walls of the section to expand or extend under the influence of internal fluid pressure to compensate for warping or distortion of the outer walls. These expansion joints are preferably arranged in substantially parallel relation, occupying in relation with the arcuate form of the section, the position of chords as is shown in Fig. 4.

In Fig. 5 there is shown a modification wherein lateral or side sections 12—12 and a tread portion 13, are enclosed within a tubular casing 14 of flexible material. The inner faces of the lateral or side sections 12, are inclined or divergent in relation one with the other and an intermediate pressure member 15 is provided having similar lateral faces engaging the inclined faces of the side section and simultaneously bearing upon the tread section. This pressure member when subjected to outward pressure exerts a wedging or camming action tending to move the lateral sections 12, outwardly and away from each other and at the same time pressing the tread section 13 bodily outwardly. The tubular casing 14 is provided with an inturned enlarged plait or expansion joint 16, which enables the casing 14 to compensate for the relative adjustment of the side and tread portions 12 and 13. A bearing bar 17 preferably formed in two longitudinal sections extends within the enlarged plait 16, of the jacket or tube 14, and transmits external pressure to the inner pressure member 15. This bearing bar is contoured to afford a continuation of the lateral side of the tubular jacket or casing, and agreeing with the internal contour of a tire casing. A wedge member 18 to be introduced intermediate the bearing portions will serve to extend such portions and exert internal lateral pressure upon the bead portion of a tire casing. Superheated steam may be circulated within the enclosure or jacket tube 14 to afford internal vulcanizing heat.

In Fig. 6 there is shown a further modification, wherein the tubular jacket of flexible heat resistant material encloses a pressure member 19 conforming to the tread portion of the tire and having a flange extending inwardly intermediate the bead portions of the tire to receive the mechanical pressure. The jacket portion 20 is reenforced at opposite sides of the flange as at 21 to afford bearings for the inclined faces 22, formed upon the inwardly projecting flange of the member 19, by which lateral wedging action is exerted by the flange to in turn exert internal lateral pressure upon the bead portion of the tire casing, the member 19 is forced outwardly in relation with the tire casing to exert pressure upon the tread portion thereof.

Cross reference is made to my copending application Serial No. 663,203 wherein are claimed certain features common to both applications.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is therefore claimed in any of its forms or modifications within the legitimate and valid scope of the appended claims.

Having thus described my invention, I claim:

1. In a tire core, a plurality of longitudinally disposed relatively movable hollow tread and side units, shaped and arranged to jointly conform to the interior of a tire casing, and a pressure bar located intermediate the units and transversely movable in relation therewith to subject the assembly of units to expanding pressure by which the normal external configurations of the assembly of units is distorted, and means to admit a fluid body to said hollow units.

2. An arcuate tire core comprising relatively movable longitudinally disposed hollow tread and side sections, and a mechanically operated pressure member radially movable in the plane of the arc and having operative engagement with the side and tread sections to exert simultaneous pressure substantially radially upon said tread section and laterally upon the side sections and means to admit a fluid body to the tread and side sections.

3. In a tire core unit, a pair of arcuate longitudinally disposed substantially ogee side sections, and a transversely convex longitudinally disposed arcuate tread section arranged in overlapping relation, the overlapping portions being reduced substantially to feather edges, whereby the faces of the sections merge easily one into another, said side and tread sections being hollow and formed from flexible but inextensible material, corrugations formed in the inner walls of said sections, to afford capability for expansion, and means for admitting fluid pressure to the interior of said sections by which the sections will be expanded.

In testimony whereof, I have hereunto set my hand this 27 day of November A. D. 1922.

ANDREW HUETTER.